United States Patent [19]

Ueno et al.

[11] 4,385,168
[45] May 24, 1983

[54] PROCESS FOR PRODUCING POLYPHENYLENE OXIDE

[75] Inventors: Katsuji Ueno, Hirakata; Takashi Maruyama; Haruo Inoue, both of Kobe; Yoshiharu Tatsukami; Michihisa Isobe, both of Niihama, all of Japan

[73] Assignee: Sumitomo Chemical Company, Limited, Osaka, Japan

[21] Appl. No.: 353,105

[22] Filed: Mar. 1, 1982

[30] Foreign Application Priority Data

Mar. 6, 1981 [JP] Japan .................................. 56-32706
Jul. 28, 1981 [JP] Japan ................................ 56-119004

[51] Int. Cl.³ ............................................ C08G 65/38
[52] U.S. Cl. .................................... 528/215; 525/132; 528/217; 528/218; 528/219
[58] Field of Search ................. 528/215, 217, 218, 219

[56] References Cited

U.S. PATENT DOCUMENTS 3,972,851  8/1976  Olander ................................ 528/215
4,184,034  1/1980  Olander ................................ 528/215

Primary Examiner—A. Ziegler
Attorney, Agent, or Firm—Stevens, Davis, Miller & Mosher

[57] ABSTRACT

A process for producing polyphenylene oxide which comprises contacting a phenolic monomer with oxygen in the presence of a catalyst composed of a manganese (II) salt and an ortho-hydroxyazo compound represented by the following formula:

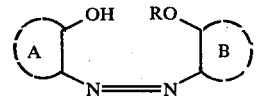

wherein A and B represent identical or different arylene ring having a valency of at least 2 and having an oxy group and an azo group directly linked to the ortho carbon atoms of the arylene ring and R represents hydrogen or lower alkyl group, or in the presence of said catalyst and an amine, in a polymerization solvent containing a base and thereby subjecting said phenolic monomer to an oxidative polymerization.

21 Claims, No Drawings

PROCESS FOR PRODUCING POLYPHENYLENE OXIDE

This invention relates to a process for producing polyphenylene oxide. More particularly, this invention relates to a process for producing polyphenylene oxide by contacting a phenolic monomer with oxygen in the presence of a manganese salt and an ortho-hydroxyazo compound in a basic reaction medium.

In the production of polyphenylene oxide by oxidative polymerization of phenolic monomer, a process using a manganese salt as catalyst is well known. For example, there have been proposed processes for producing polyphenylene oxide by using, as catalyst, manganese salt-tertiary amine complex (Japanese Patent Publication No. 3,195/67), manganese salt-amine complex (U.S. Pat. No. 3,337,501), manganese salt-alkali metal alcoholate (Japanese Patent Publication No. 619/72) and the like. Further, as processes using manganese complex, there are also known the processes of Japanese patent application Kokai (Laid-Open) Nos. 34,995/76, 34,996/76, 94,599/78, 94,600/78 and Japanese Pat. No. 18,919/75. It is said that the use of these catalysts is effective for increasing the velocity of forming polyphenylene oxide by the oxidative coupling of phenolic monomer.

Although these processes are sufficiently useful, it is still desired to reduce the amount of catalyst used by employing a catalyst having a higher activity and a higher selectivity and to improve the yield of polymer.

The present inventors have found that polyphenylene oxide can be obtained in a high yield by using a manganese salt and a certain kind of ortho-hydroxyazo compound as a catalyst of high activity and high selectivity. More surprisingly, it was also found that, by adding a certain kind of amine thereto, a polyphenylene oxide of very high molecular weight can be obtained at a low catalyst concentration and, at the same time, a polyphenylene oxide-styrene resin composition prepared by blending the polyphenylene oxide thus obtained with a styrene resin is particularly excellent in impact strength characteristics. This invention was accomplished on the basis of the above-mentioned findings.

It is an object of this invention to provide a process for producing polyphenylene oxide with high efficiency by using a novel catalyst system having a high activity and a high selectivity.

Other objects and advantages of this invention will become apparent from the descriptions given below.

According to this invention, there is provided a process for producing polyphenylene oxide which comprises contacting a phenolic monomer with oxygen in the presence of a catalyst composed of a manganese salt and an ortho-hydroxyazo compound represented by the following general formula:

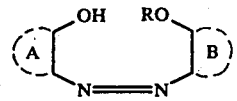
(1)

wherein A and B represent identical or different arylene ring having a valency of at least 2 and having an oxy group and an azo group directly linked to the ortho carbon atoms of the arylene ring and R represents hydrogen or lower alkyl group, or in the presence of said catalyst and an amine, in a polymerization solvent containing a base.

In the scope of formula (1), compounds of which A and B are selected from monocyclic and polycyclic organic groups having about 6 to about 30 carbon atoms are included. Among them, those in which A and B are phenylene or naphthylene are preferable and substituted derivatives of such compounds are also preferable. Among said substituted derivatives, those having sulfonic acid group or salt thereof as substituent are particularly preferable.

The phenolic monomer used in this invention is a compound having a structure represented by the following formula:

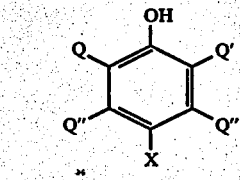

wherein X is one member selected from the group consisting of hydrogen atom, chlorine atom, bromine atom and iodine atom; Q is monovalent substituent selected from alkyl groups, alkoxy groups and halogenated alkyl and alkoxy groups having at least two carbon atoms between the halogen atom and the phenol nucleus; Q' is one member selected from the group consisting of halogen atom and the groups mentioned above with regard to Q; and each Q" is one member selected from the group consisting of hydrogen atom and the groups mentioned above with regard to Q'.

Concrete examples of the phenolic monomer usable in this invention include, for example, 2,6-dimethylphenol, 2,6-diethylphenol, 2,6-dibutylphenol, 2,6-dilaurylphenol, 2,6-dipropylphenol, 2,6-diphenylphenol, 2,6-dimethoxyphenol, 2,3,6-trimethylphenol, 2,3,5,6-tetramethylphenol, 2,6-diethoxyphenol, 2-ethyl-6-stearyloxyphenol, 2,6-di(chlorophenoxy)-phenol, 2,6-dimethyl-3-chlorophenol, 2,6-dimethyl-4-chlorophenol, 2,6-dimethyl-3-chloro-5-bromophenol, 2,6-di(chloroethyl)-phenol, 2-methyl-6-isobutylphenol, 2-methyl-6-phenylphenol, 2,6-dibenzylphenol, 2,6-ditolylphenol, 2,6-di(chloropropyl)-phenol, 3-methyl-6-tert-butylphenol and the like. They may be used either alone or may be used in combination with other phenolic monomer for producing a copolymer.

Among them, 2,6-dimethylphenol is particularly preferably usable.

The catalyst composed of a manganese salt and an ortho-hydroxyazo compound is prepared by combining them in an arbitrary proportion. For effectively preparing the catalyst, a solvent capable of at least partially dissolving or dispersing both the manganese (II) salt and ortho-hydroxyazo compound is used. For example, an appropriate solvent such as methanol, chlorobenzene, toluene, xylene or their mixtures is used.

An inorganic base having a basic character can be added into said solvent.

Although the manganese (II) salt and the orthohydroxyazo compound may be combined in any amount in general, it is preferable to use about 1 mole or more and particularly about 2 moles of the ortho-hydroxyazo compound per 1 mole of the manganese (II) salt.

Although the structure of the catalyst composed of manganese (II) salt and ortho-hydroxyazo compound is unknown, it assumably forms a complex of manganese (II) salt-ortho-hydroxyazo compound in solution. Accordingly, said manganese (II) salt includes divalent manganese ion, also.

The manganese (II) salts usable in this invention include manganese (II) halogenides such as manganese (II) chloride, manganese (II) bromide, manganese (II) iodide and the like, as well as other manganese (II) compounds such as manganese (II) carbonate, manganese (II) oxalate, manganese (II) sulfate, manganese (II) nitrate, manganese (II) phosphate, manganese (II) acetate and hydrates of these manganese (II) compounds.

Among them, manganese chloride, manganese sulfate, manganese acetate and their hydrates are preferable, and manganese chloride is particularly preferable.

As said ortho-hydroxyazo compound usable in this invention, the compounds represented by the above-mentioned formula (1) are usable. In the scope of formula (1), compounds of which A and B are selected from monocyclic and polycyclic organic groups having about 6 to about 30 carbon atoms are included. Among them, compounds in which A and B are phenylene or naphthylene are preferable and their substituted derivatives are also preferable.

As said substituent, any groups may be selected. Examples of said substituent include hydroxyl group, sulfonic acid group and its salts, carboxylic acid group and its salts, nitro group, carboxylic ester group, amino group, amide group, alkyl group, alkoxy group, aryl group, arylazo group, halogen group, sulfonamide group and the like. Among them, alkali metal salts of sulfonic acid are preferable in point that they improve solubility. It is desirable that either of ring A and ring B has at least one sulfonic acid group or its salt.

Concrete examples of the ortho-hydroxyazo compound usable in this invention include the followings: o-(2-hydroxy-5-sulfophenylazo)-phenol, 1-(2'-hydroxyphenylazo)-4-sulfo-β-naphthol, 1-(2'-hydroxynaphthyl-1'-azo)-4-sulfo-6-nitro-β-naphthol, 2-(2'-hydroxy-3'-sulfo-5'-chlorophenylazo)-4-sulfo-α-naphthol, 1-(2'-hydroxy-3'-nitro-5'-sulfophenylazo)-β-naphthol, 1-(2'-hydroxy-3'-sulfo-5'-nitrophenylazo)-2-hydroxy-dibenzofuran, 1-(2'-hydroxy-4'-sulfonaphthyl-1'-azo)-β-naphthol, 2-(2'-hydroxy-4'-sulfonaphthyl-1'-azo)-α-naphthol, 1-(2'-hydroxy-3'-sulfo-5'-chlorophenylazo)-3-acetylamino-β-naphthol, 1-(2'-hydroxy-3'-nitro-5'-methylphenylazo)-4-sulfo-6-acetylamino-β-naphthol, 2-(2'-hydroxy-5'-sulfophenylazo)-4',5'-dihydroxynaphthalene, 1-(1'-hydroxynaphthyl-2'-azo)-4-sulfo-6-nitro-β-naphthol, 2-(2'-hydroxy-3'-sulfo-5'-chlorophenylazo)-1,5-dihydroxynaphthalene, 2-(2'-hydroxy-3'-sulfo-5'-chlorophenylazo)-5-sulfo-α-naphthol, 2-(2'-hydroxy-3',5'-dinitrophenylazo)-5-sulfo-α-naphthol, 2-(2'-hydroxy-4'-sulfo-6-nitro-naphthyl-1'-azo)-8-sulfo-α-naphthol, 2-(2'-hydroxy-3',5',6'-trichlorophenylazo)-5-sulfo-3-acetylamino-α-naphthol, 1-(2'-hydroxy-5'-sulfophenylazo)-β-naphthol, o-(2-hydroxyphenylazo)-phenol, 6-(2-hydroxyphenylazo)-resorcin, o-(2-hydroxy-5-nitrophenylazo)-phenol, 2-(2'-hydroxy-3',5'-dinitrophenylazo)-4-t-butyl-6-methylphenol, 2-(2'-hydroxy-5'-chlorophenylazo)-3,7-disulfo-1,8-dihydroxynaphthalene, 2-acetylamino-6-(2'-hydroxy-3',5'-dinitrophenylazo)-p-cresol and the like.

Among them, 1-(2'-hydroxy-5'-sulfophenylazo)-β-naphthol, 1-(1'-hydroxynaphthyl-2'-azo)-4-sulfo-6-nitro-β-naphthol, 2-(2'-hydroxy-4'-sulfonaphthyl-1'-azo)-α-naphthol and the like are preferable, and their sulfonic acid salts and their sodium salts (shown below) are more preferable.

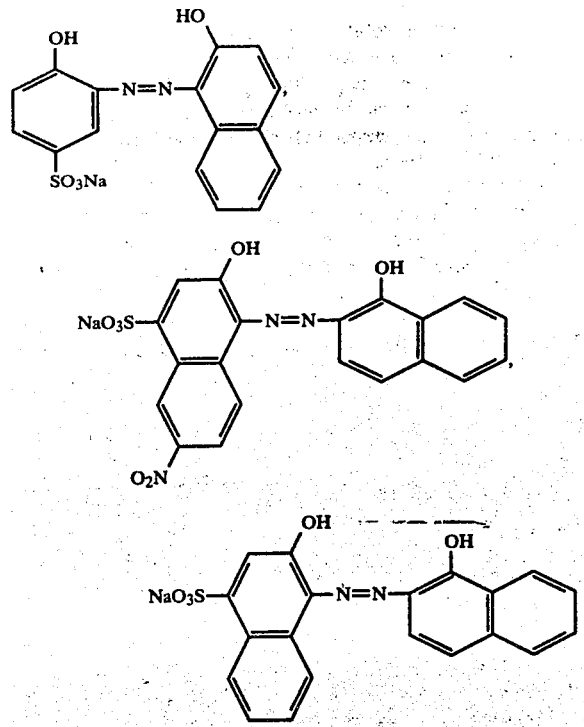

Said ortho-hydroxyazo compound is used at a molar ratio of 1/25 or less and preferably 1/50 to 1/2500 to the phenolic monomer.

The oxidative coupling of the phenolic monomer can be achieved by mixing together a catalyst, an amine and a monomer in an appropriate polymerization solvent in the presence of a base and introducing an oxygen-containing gas at a flow rate much exceeding the amount absorbed.

A preferable polymerization solvent is a mixture comprising a lower alkanol having 1 to 6 carbon atoms (for example, methanol) and an aromatic organic solvent (for example, benzene, toluene, chlorobenzene, xylene or styrene). The relative proportion of phenolic monomer to the solvent can be varied in a wide range. In general, the proportion is preferably 40:60 to 5:95 as expressed by percent by weight, and more preferably 30:70 to 10:90.

The oxidative coupling of the phenolic monomer accelerated by the manganese (II) catalyst must be carried out in a basic reaction medium obtainable by adding to a polymerization solvent a strong base such as alkali metal hydroxide, alkali metal alkoxide, their mixture or the like. Readily available commercial alkali metal bases such as sodium hydroxide, potassium hydroxide, lithium hydroxide, sodium methoxide and the like are preferably used. Although it is usually considered that the use of anhydrous sodium hydroxide is desirable for giving a strongly basic reaction environment essentially necessary to the polymerization reaction, it is also allowable for convenience to use its aqueous solution such as 48% aqueous solution of sodium hydroxide. The amount of alkali metal base indispensable for accelerating the oxidative coupling of phenols is generally in such a range that the molar ratio of phenol: alkali metal base is in the range of about 1:1 to 100:1, preferably about 40:1 to 5:1 and more preferably about 20:1 to about 10:1. According to the optimum reaction conditions for forming polyphenylene oxide from 2,6-xylenol, the molar ratio of 2,6-xylenol: alkali metal hydroxide is preferably in the range of about 14:1 to 18:1, generally.

In general, the molar ratio of the catalyst composed of manganese (II) salt and ortho-hydroxyazo compound to the phenolic monomer is varied in a very wide range in order to adjust the polymerization velocity to phenylene oxide to a desired magnitude (minimum, maximum or optimum). It has been found that a formation velocity of polyphenylene oxide comparable to that in prior process or often greater than it can be obtained by using the catalyst composed of manganese (II) salt and ortho-hydroxyazo compound in a very small amount as compared with the amount of phenolic monomer. In general, however, the manganese (II) type catalyst is used in an amount giving a molar ratio to phenolic monomer of about 1/50 or less, and preferably about 1/100 to about 1/5,000, though its amount may vary depending on the kind of ortho-hydroxyazo compound combined with the manganese (II) salt.

The reaction temperature for the preparation of polyphenylene oxide in the presence of manganese complex catalyst can be varied in a wide range. In general, the polymerization temperature is appropriately in the range of about 0° C. to about 60° C. and preferably in the range of about 10° C. to about 50° C. And, in view of the generally known fact that the optimum self-condensation reaction velocity is obtained in the temperature range of 20° to 40° C., the more preferable range of the polymerization temperature is about 20° to 40° C.

Since the self-condensation reaction of phenols is generally exothermic in its nature and manganese (II) chelates are susceptible to thermal deterioration of activity, it is also possible to keep the reaction temperature in the optimum range by controlling the addition of manganese (II) chelate catalyst and the phenolic monomer during their initial contact in the reaction medium.

Further, according to the process of this invention, the reaction can also be carried out at a pressure higher than atmospheric pressure. For example, a pressure of 1 to 100 kg/cm$^2$ is employed.

If a polyphenylene oxide having the intended intrinsic viscosity, as measured in chloroform at 25° C., has been obtained, the reaction is stopped by adding an amount, enough to neutralize the reaction mixture, of aqueous solution of acetic acid, sulfuric acid, hydrochloric acid or the like into the reactor. After the neutralization, the whole reaction mixture is precipitated with an appropriate solvent such as methanol, and then the product is isolated therefrom according to conventional method.

In this invention, an arbitrary amine can be used in coexistence with the catalyst under a condition that its existence brings about no substantial decrease in the self-condensation reaction velocity of phenols throughout the process for producing polyphenylene oxide. A polyphenylene oxide produced by the use of a combination of an amine and the catalyst composed of manganese (II) salt and ortho-hydroxyazo compound gives a polyphenylene oxide-styrene resin composition excellent in impact strength characteristics when blended with a styrene resin. Among the above, the use of aliphatic secondary amines, cyclic secondary amines or amines having branched structure can give a polyphenylene oxide from which a polyphenylene oxide-styrene resin composition excellent in impact strength characteristics can be obtained. The composition thus obtained is particularly characterized in that it is free from deterioration of physical properties when molded at high temperatures.

Quite unexpectedly, it has been found that the velocity of reaction can be increased by using an amine having branched structure, among the amines, in combination with the catalyst composed of manganese (II) salt and ortho-hydroxyazo compound. By using said amine, the velocity of reaction can be improved so that the overall time required for the polymerization reaction can be shortened, and optionally the amount of catalyst used for the oxidative coupling of phenolic monomer can be decreased.

The amines usable in this invention include primary, secondary and tertiary monoamines and polyamines. Examples of said amines include aliphatic primary amines such as methylamine, ethylamine, propylamine, butylamine and the like; cycloalkylamines such as cyclohexylamine and the like; diamines such as ethylenediamine, triethylenediamine, hexamethylenediamine and the like; aliphatic secondary amines such as dimethylamine, diethylamine, dipropylamine, dibutylamine and the like; cycloalkyl secondary amines such as dicyclohexylamine and the like; cyclic secondary amines such as piperidine, piperazine, morpholine, pyrrolidine and the like; aliphatic tertiary amines such as trimethylamine, triethylamine, diethylmethylamine, benzyldimethylamine and the like; pyridines such as pyridine, picoline and the like; cyclic amines such as N-alkylpyrrol, quinoline, isoquinoline, N-alkylpiperidine, N-alkylmorpholine and the like; and primary, secondary and tertiary alkanolamines such as ethanolamine, diethanolamine, triethanolamine and the like.

Among them, useful aliphatic secondary amines are those having the following formula:

$$HNR^1R^2 \qquad (2)$$

wherein $R^1$ and $R^2$ independently represent a group selected from acyclic and cyclic hydrocarbon groups such as alkyl group, cycloalkyl group, aryalkyl group, arylcycloalkyl group, cycloalkylalkyl group and the like.

Usually, they are preferably amines of formula (2) wherein $R^1$ and $R^2$ each have 1–30 carbon atoms, more preferably 1–20 carbon atoms and most preferably 1–10 carbon atoms.

Concrete examples of said useful aliphatic secondary amine include dimethylamine; diethylamine; dipropylamines such as diisopropylamine and di-n-propylamine; dibutylamines such as di-n-butylamine, diisobutylamine and di-t-butylamine; dipentylamines; dihexylamines; diheptylamines; dioctylamines; dinonylamines; didecylamines; methyl-ethylamine; methyl-butylamines; methylcyclohexylamine; heptylcyclohexylamines; methyl-benzylamine; dibenzylamine; 1-methylamino-2-phenylpropane; allylethylamine and the like.

Useful aliphatic secondary polyamines are those having the following formula:

$$R^5\text{-}(NR^3R^4)_y \qquad (3)$$

wherein at least one of $R^3$'s is hydrogen atom and the others of $R^3$'s are hydrogen atom or have the same significance as the aforementioned $R^1$ and $R^2$; $R^4$ has the same significance as the aforementioned $R^1$ and $R^2$; $R^5$ represents acyclic or cyclic polyvalent organic group and preferably saturated divalent hydrocarbon group such as alkylene group, cycloalkylene group, aralkylene group, arylcycloalkylene group, cycloalkylalkylene group or the like or a group consisting of their mixture; and y represents an integer of 2 or greater; provided that at least 4 carbon atoms exist between two nitrogen atoms.

Usually, as concrete examples of preferable aliphatic secondary polyamines represented by formula (3), N-alkyl-, N,N'-dialkyl- and N,N',N'-trialkylbutanediamines, -pentanediamines, -hexanediamines, -octanediamines, -nonanediamines and the like can be referred to. They are, for example, N-methyl-1,4-butanediamine, N-methyl-N'-ethyl-1,4-butanediamine, N,N'-dimethyl-1,4-butanediamine, N,N,N'-trimethyl-1,4-butanediamine, N-methyl-1,4-isopentanediamine, N-methyl-N'-ethyl-1,5-pentanediamine, N,N'-dipropyl-1,4-isopentanediamine, N,N,N'-tributyl-1,5-pentanediamine, N-methyl-1,6-hexanediamine, N,N'-diethyl-1,5-hexanediamine and the like.

As preferable examples of cyclic secondary amine, 1,3-di-4-piperidinylpropane, piperidine and piperazine can be referred to.

As the amines having branched structure usable in this invention, alkylamines, cycloalkylamines and their substituted derivatives can be referred to. Among them amines having 3 to about 30, preferably 3 to about 15 carbon atoms are preferable. Their concrete examples include isopropylamine, isobutylamine, secondary butylamine, tertiary butylamine, isoamylamine, neopentylamine, 1-ethylpropylamine, 1,1-dimethylpropylamine, 2-ethylhexylamine, cyclohexylamine, 4-isopropylcyclohexylamine, 1-isopropyl-isobutylamine, menthylamine, bornylamine and the like, among which isobutylamine, isopropylamine and 2-ethylhexylamine particularly accelerate the reaction and give a polyphenylene oxide of which blend with styrene resin has excellent impact strength characteristics.

Although the amount of amine used in this invention can be varied in a wide range and selected arbitrarily, the amount of amine used is 0.05 to 20% by mole, preferably 0.1 to 10% by mole and particularly preferably 0.5 to 2% by mole based on the phenolic monomer in order to obtain a polyphenylene oxide capable of giving a thermoplastic composition having the desired impact strength characteristics when blended with styrene resin.

In general, a polyphenylene oxide produced in the absence of amine shows a notched Izod impact strength as low as about 10 kg-cm/cm or less regardless of the amount of styrene resin blended therewith. Contrariwise, a blend of styrene resin and a polyphenylene oxide produced in the presence of amine usually shows a notched Izod impact strength as high as about 15 to about 20 kg-cm/cm usually and sometimes 25 kg-cm/cm or more. That is, if a blend of styrene resin and a polyphenylene oxide produced in the presence of an amine is compared with a blend of the same styrene resin and a polyphenylene oxide produced in the absence of an amine, the former has at least 1.5 times, often 2 times and in many cases 3 to 5 times the impact strength as great as that of the latter.

As has been mentioned above, the polyphenylene oxide produced according to the process of this invention has an improved impact strength when blended with a styrene resin having at least 25% by weight of polymer unit derived from a compound represented by the following formula:

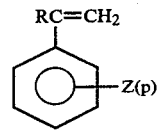

wherein R represents hydrogen, lower alkyl group or halogen; Z represents a group or an atom selected from the group consisting of vinyl, hydrogen, chlorine and lower alkyl; and p represents an integer of 0 to 5.

The "styrene resin" defined herein includes, for example, homopolymers such as polystyrene and polychlorostyrene; modified polystyrenes such as rubber-modified polystyrene; styrene-containing copolymers such as styrene-acrylonitrile copolymer, styrene-butadiene copolymer, styrene-acrylonitrile-α-alkylstyrene copolymer and stryene-acrylonitrile-butadiene copolymer; poly-α-methylstyrene; ethylvinylbenzene-divinylbenzene copolymer; and the like.

Preferable styrene resins are modified polystyrene, polystyrene and styrene-acrylonitrile-butadiene copolymer having a high impact resistance.

As the method for blending polyphenylete oxide with styrene resin, any methods can be employed. A preferable method of blending comprises mixing these two kinds of polymers in the form of powder or granule, extruding the mixture and cutting the extruded mixture into pellets.

The polyphenylene oxide and the styrene resin can be mixed together in any proportion. Accordingly, all the resin blends consisting of 1 to 99% by weight of polyphenylene oxide and 99 to 1% by weight of styrene resin are included in the scope of this invention. Generally saying, preferable resin blends of this invention are those containing polyphenylene oxide and styrene resin at a ratio (by weight) of about 30:70 to 70:30, more preferably 40:60 to 60:40 and further more preferably 45:55 to 55:45.

Next, the process of this invention will be explained with reference to the following examples which are presented only in an illustrative way and do not limit the scope of this invention.

In the following examples, the intrinsic viscosity of the polyphenyleneoxide was measured in chloroform at 25° C. unless otherwise specified.

EXAMPLE 1

Into 97.6 g of methanol were dissolved 0.001 mole of manganese chloride, 0.002 mole of Eriochrome Black T (trade name of 1-(1'-hydroxynaphthyl-2'-azo)-6-nitro-2-hydroxynaphthyl-4-sulfonic acid sodium salt manufactured by Tokyo Kasei Kogyo K.K.) and 0.0624 mole of sodium hydroxide, to which was added a solution of 1 mole of 2,6-dimethylphenol in 380.8 g of xylene. While introducing oxygen at a flow rate of 500 ml/minute, it was polymerized with stirring at 30° C. After 3 hours, the polymerization mixture was neutralized with 5 ml of hydrochloric acid and the polymer was deposited with methanol. The polymer deposited had an intrinsic biscosity of 0.60 dl/g. Its yield was 97.2%. The molar ratio 2,6-xylenol:manganese (II) salt was 1,000:1.

EXAMPLE 2

Into 97 g of methanol were dissolved 0.001 mole of manganese acetate, 0.002 mole of Eriochrome Blue-Black B (trade name of 1-(1'-hydroxynaphthyl-2'-azo)-2-hydroxynaphthyl-4-sulfonic acid sodium salt manufactured by Tokyo Kasei Kogyo K.K.), 0.007 mole of di-n-butylamine and 6.1 g of 40% aqueous solution of sodium hydroxide, to which was added a solution of 1 mole of 2,6-dimethylphenol in 380 g of xylene. After elevating the pressure of reactor to 7 kg/cm², compressed air was introduced thereinto at a flow rate of 2.5 N liters/minute. After a reaction for 5 hours, the reaction mixture was neutralized with acetic acid and the polymer was deposited with methanol. The deposited polymer had an intrinsic viscosity of 0.54 dl/g. Its yield was 98%. The molar ratio 2,6-xylenol:manganese (II) salt was 1,000:1.

COMPARATIVE EXAMPLE 1

Into 97 g of methanol were dissolved 0.002 mole of manganese chloride and 0.062 mole of sodium hydroxide, to which was added a solution of 1 mole of 2,6-dimethylphenol in 380 g of xylene. While introducing oxygen, reaction and treatment were carried out in the same manner as in Example 1. The polymer thus obtained had an intrinsic viscosity of 0.08 dl/g.

From this result, the effectiveness of the use of Eriochrome Black T-manganese (II) salt complex is understandable.

COMPARATIVE EXAMPLE 2

The reaction of Example 1 was repeated, except that the sodium hydroxide was not used. As the result, polymer was hardly obtained. From this fact, the essential necessity of basic medium is understandable.

EXAMPLES 3–6

A series of reactions were carried out according to the method of Example 1. The molar ratio 2,6-xylenol:-manganese (II) salt at the time of charge was adjusted to 500:1 to 5,000:1 by controlling the amounts of manganese chloride and Eriochrome Black T. The results are summarized in Table 1.

TABLE 1

| Example (No.) | Xylenol/ Mn (II) salt (molar ratio) | Reaction time (hours) | Intrinsic viscosity (dl/g) |
|---|---|---|---|
| 3 | 500:1 | 2 | 0.83 |
| 1 | 1,000:1 | 2 | 0.60 |
| 4 | 2,000:1 | 4 | 0.58 |
| 5 | 3,000:1 | 4 | 0.45 |
| 6 | 4,000:1 | 4 | 0.10 |

EXAMPLE 7–20

A series of oxidative coupling reactions were carried out by using the same reaction medium and the same components as used in Example 1, except that different ortho-hydroxyazo compounds were used in the preparation of manganese (II) catalyst. The results of the reaction are summarized in Table 2.

The formulas and the positions of substitution of the ortho-hydroxyazo compounds mentioned Table 2 are as follows.

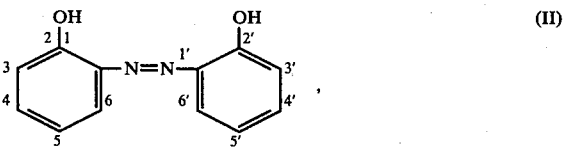

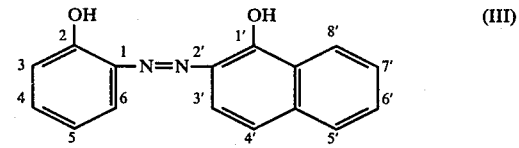

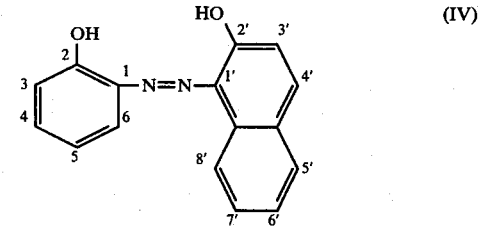

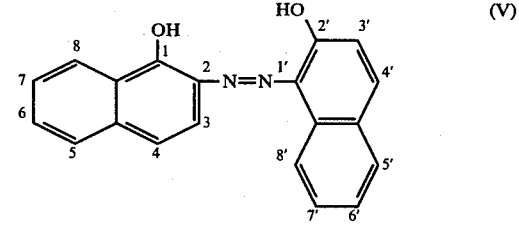

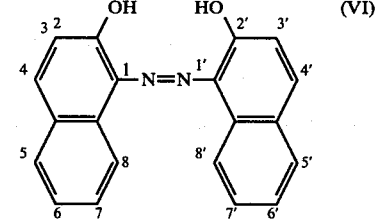

TABLE 2

| Example No. | Ortho-hydroxyazo compound | | Xylenol/ Mn (II) salt (molar ratio) | Reaction time (hours) | Intrinsic viscosity (dl/g) |
|---|---|---|---|---|---|
| | Formula | Kind of substituent | | | |
| 7 | (II) | Unsubstituted | 100:1 | 4 | 0.45 |
| 8 | (II) | 4'-OH | 100:1 | 4 | 0.44 |
| 9 | (II) | 4-NO₂ | 250:1 | 3 | 0.47 |
| 10 | (II) | 3-NO₂, 5-NO₂, 3'-CH₃, 5'-t-C₄H₉ | 250:1 | 4 | 0.53 |
| 11 | (III) | 5-Cl, 4'-SO₃Na | 200:1 | 4 | 0.51 |
| 12 | (III) | 5-SO₃Na, 5'-OH | 200:1 | 4 | 0.46 |
| 13 | (III) | 4-SO₂NH₂, 5'-Cl, 8'-Cl | 200:1 | 8 | 0.45 |
| 14 | (IV) | Unsubstituted | 200:1 | 4 | 0.45 |
| 15 | (IV) | 4'-SO₃Na | 250:1 | 4 | 0.50 |
| 16 | (IV) | 3-NO₂, 5-SO₃Na | 250:1 | 3 | 0.57 |

TABLE 2-continued

| Example No. | Ortho-hydroxyazo compound Formula | Kind of substituent | Xylenol/ Mn (II) salt (molar ratio) | Reaction time (hours) | Intrinsic viscosity (dl/g) |
|---|---|---|---|---|---|
| 17 | (V) | 4'-SO₃Na | 500:1 | 3 | 0.55 |
| 18 | (V) | 4'-SO₃Na, 6'-NO₂ | 500:1 | 3 | 0.61 |
| 19 | (VI) | 4-SO₃Na, 6-NO₂ (Eriochrome Black T)* | 2000:1 | 4 | 0.58 |
| 20 | (VI) | 4-SO₃Na (Eriochrome Blue-Black B)** | 1000:1 | 3 | 0.62 |

*1-(1'-Hydroxy-naphthyl-2'-azo)-6-nitro-2-hydroxy-naphthyl-4-sulfonic acid sodium salt.
**1-(1'-Hydroxy-naphtht1-2'-azo)-2-hydroxy-naphthyl-4-sulfonic acid sodium salt.
(each compound was manufactured by Tokyo Kasei Kogyo K.K.)

EXAMPLES 21–33 AND COMPARATIVE EXAMPLES 3–4

A series of polyphenylene oxides were produced by using various amines, provided that no amine was used in the comparative examples. Thus, a solution of 1 mole of 2,6-xylenol in xylene and 0.06 mole of sodium hydroxide, 0.001 mole of manganese chloride, 0.002 mole of Erichrome Black T [trade name of 1-(1'-Hydroxy-naphthyl-2-azo)-6-nitro-2-hydroxy-naphthyl-4-sulfonic acid sodium salt produced by Tokyo Kasei Kogyo K.K.] and an amine, all dissolved into respective possible smallest quantity of methanol, were successively charged into a reactor. The proportion of xylene to methanol was adjusted so as to become 80/20 by weight. While vigorously stirring the solution, oxygen gas was introduced into the solution at a rate excessive to the absorption. The reaction temperature was controlled in the range of 30° to 35° C.

When the polymerization had reached the desired extent, the introduction of oxygen gas was stopped and an amount, enough to neutralize the reaction medium, of aqueous hydrochloric acid or acetic acid was added to stop the reaction. After the neutralization, the resulting polyphenylene oxide was precipitated with methanol. A mixture consisting of 50 parts by weight of the polyphenylene oxide thus obtained, 39 parts by weight of rubber-modified high impact styrene resin (Esblite ® 500 AS manufactured by Nippon Polystyrene K.K.) and 11 parts by weight of EPDM-modified polystyrene [synthesized from 50 parts by weight of Esprene ® 505 (manufactured by Sumitomo Chemical Company Ltd.) and 50 parts by weight of styrene by the process of Japanese patent application Kokai (Laid-Open) No. 55,692/75] was blended and kneaded by means of Brabender Plastograph at 250° C. for 10 minutes and then press-molded, and Izod impact strength of the molded product was measured.

The kind and amount of amine used and the properties of polyphenylene oxide-styrene resin blend are summarized in Table 3.

TABLE 3

| | Kind of amine | Amount of amine used (% by mole based on 2,6-xylenol) | Intrinsic viscosity of polyphenylene oxide (dl/g) | Izod impact strength (notched) of polyphenylene oxide-styrene resin composition (kg.cm/cm) Molding temperature (°C.) | |
|---|---|---|---|---|---|
| | | | | 250 | 290 |
| Example No. | | | | | |
| 21 | n-Butylamine | 1 | 0.51 | 22.1 | 17 |
| 22 | n-Hexylamine | 1 | 0.52 | 24 | 20 |
| 23 | Isobutylamine | 1 | 0.58 | 27 | 25 |
| 24 | Isobutylamine | 1.4 | 0.61 | 28 | 25 |
| 25 | 2-Ethylhexylamine | 1 | 0.55 | 26 | 23 |
| 26 | 2-Ethylhexylamine | 1.4 | 0.58 | 27 | 24 |
| 27 | Isopropylamine | 1.1 | 0.60 | 25 | 22 |
| 28 | Cyclohexylamine | 1.1 | 0.52 | 24 | 21 |
| 29 | Di-n-butylamine | 0.98 | 0.51 | 25 | 23 |
| 30 | Di-n-butylamine | 1.4 | 0.55 | 26 | 23 |
| 31 | Di-isobutylamine | 1 | 0.50 | 23 | 20 |
| 32 | 1,3-Dipiperidylpropane | 1 | 0.68 | 27 | 25 |
| 33 | Benzylamine | 1 | 0.51 | 21 | 12 |
| Comparative Example | | | | | |
| 3 | — | — | 0.45 | 10 | 8.1 |
| 4 | — | — | 0.60 | 11 | 9.2 |

Table 3 demonstrates that the blends of polyphenylene oxide produced by the combined use of amine are quite excellent in impact strength as compared with Comparative Examples 3 and 4.

It is also demonstrated there that, as compared with the straight chain primary amines of Examples 21, 22 and 33, the amines having branched structure (Examples 23–27) and the secondary amines (Examples 29–32) give polyphenylene oxides from which resin blends more excellent in impact strength characteristics can be obtained.

EXAMPLES 34–45 AND COMPARATIVE EXAMPLE 5

Polymerization was carried out by the use of various amines by repeating the procedure of Example 21, and $\eta_{sp}/C$ (at 0.5 g/dl in chloroform at 25° C.) reached after a definite period of time was compared between the polymers obtained.

The results are summarized in Table 4.

The manganese salt and the hydroxyazo compound were used in amounts of 0.05% by mole and 0.1% by mole, respectively, based on 2,6-xylenol, and alkali was used in an amount of 6.1% by mole.

Table 4 demonstrates that, among the amines used, the amines having branched structure give a polyphenylene oxide having a higher value of $\eta_{sp}/C$ in a shorter period of time. (Examples 34–39).

TABLE 4

| Example No. | Kind of amine | Amount of amine used (% by mole based on 2,6-xylenol) | $\eta_{sp}/C$ reached After 2 hours | After 3 hours |
|---|---|---|---|---|
| Comparative Example 5 | — | — | 0.29 | 0.45 |
| Example 34 | 2-Ethylhexylamine | 1.0 | 0.42 | 0.50 |
| 35 | 2-Ethylhexylamine | 0.5 | 0.47 | 0.55 |
| 36 | Isobutylamine | 1.0 | 0.42 | 0.53 |
| 37 | Isobutylamine | 0.5 | 0.48 | 0.59 |
| 38 | t-Butylamine | 1.0 | 0.31 | 0.45 |
| 39 | Isopropylamine | 1.0 | 0.33 | 0.46 |
| 40 | n-Butylamine | 1.0 | 0.24 | 0.41 |
| 41 | Di(n-butyl)amine | 1.0 | 0.30 | 0.44 |
| 42 | Di(n-butyl)amine | 1.4 | 0.29 | 0.44 |
| 43 | 1,3-Dipiperidyl-propane | 1.0 | 0.33 | 0.56 |
| 44 | n-Hexylamine | 1.0 | 0.20 | 0.42 |
| 45 | n-Laurylamine | 1.0 | 0.12 | 0.23 |

EXAMPLE 46

0.001 mole of manganese acetate and 0.001 mole of 1-(2-hydroxy-5-sulfophenylazo)-δ-naphthol were separately dissolved into 50 g of methanol. On the other hand, 1 mole of 2,6-dimethylphenol was dissolved into 335 g of xylene, to which were successively added the methanolic solution of azo compound and the methanolic solution of manganese acetate in this order. Then, after adding 44 g of methanol containing 0.06 mole of sodium hydroxide, oxygen was introduced at a flow rate of 200 ml/minute and polymerization was carried out with stirring at 30° C. After 4 hours, 5 ml of acetic acid was added to the polymerization mixture and the polymer was deposited with methanol. The polymer deposited had an intrinsic viscosity of 0.50 dl/g.

EXAMPLE 47

(Preparation of Polyphenylene Oxide)

Into 36.6 kg of xylene was dissolved 12.2 kg of 2,6-dimethylphenol. The resulting solution and 0.24 kg of sodium hydroxide, 0.128 kg of piperidine, 55.4 kg of Sunchromine Black ET conc. (tradename of a Dyestuff manufactured by Sumitomo Chemical Company Ltd.) and 7.7 g of manganese dichloride dihydrate, all dissolved into respective possible smallest quantity of methanol, were successively charged into a reactor. Then, an additional amount of methanol was charged so that the total quantity of methanol became 12.2 kg.

After elevating the pressure in the reactor to 8 kg/cm$^2$ G, air was introduced thereinto at a rate of 50 liters/minute while vigorously stirring the content.

After conducting the reaction for 6 hours, 0.6 kg of acetic acid and 50 kg of methanol were added and the resulting mixture was heat-treated at 60° C. The deposited polyphenylene oxide was collected by filtration, thoroughly washed with methanol and then dried. The polyphenylene oxide thus obtained had an intrinsic viscosity of 0.52 dl/g.

(Preparation of Polyphenylene Oxide Blend)

Fifty parts of the polyphenylene oxide thus obtained was thoroughly blended with 50 parts of rubber-modified high impact styrene resin (Cosden 945 manufactured by Cosden Oil Co.), and the mixture was kneaded and granulated at 260° C. by means of dual-worm granulator. The granule obtained was injection molded at 260° C. or 300° C., and the molded products were tested for Izod impact strength.

The notched Izod impact strengths of the specimens molded at 260° C. and 300° C. were 22 kg·cm/cm and 20 kg·cm/cm, respectively.

EXAMPLES 48 AND 49 AND COMPARATIVE EXAMPLE 6

The procedure of Example 47 was repeated, except that piperidine was replaced with morpholine (Example 48) or with isobutylamine (Example 49) or piperidine was not used.

The results are summarized in Table 5 together with the results of Example 47.

TABLE 5

| Example No. | Kind of amine | Amount of amine used (% by mole based on 2,6-dimethyl-phenol) | Intrinsic viscosity of polyphenylene oxide (dl/g) | Izod impact strength (notched) of composition (kg.cm/cm) Molding temperature (°C.) 260 | 300 |
|---|---|---|---|---|---|
| 47 | Piperidine | 1.5 | 0.52 | 22 | 20 |
| 48 | Morpholine | 1.5 | 0.58 | 19 | 20 |
| 49 | Isobutyl-amine | 1.5 | 0.58 | 20 | 19 |
| Comparative Example 6 | — | — | 0.56 | 10 | 7 |

EXAMPLE 49

The polyphenylene oxide produced by the same manner as in Example 47 and a polyphenylene oxide produced by a known process (the process of Japanese Pat. No. 35,080/77 wherein manganese-monoethanolamine catalyst is used) which has hitherto been said to be excellent in heat stability were formulated according to the following recipe:

Polyphenylene oxide: 45 parts by weight
High impact polystyrene resin (1): 55 parts by weight
Polyethylene (2): 1 part by weight and the formulated mixtures were kneaded and granulated.

(1) The high impact polystyrene resin herein used was produced by the graft polymerization of styrene by using trans polybutadiene as the rubber so that rubber content became 9%. The polystyrene part had an intrinsic viscosity of 0.85 dl/g as measured in Chloroform at 30° C.

(2) Sumikathene F-210-7, manufactured by Sumitomo Chemical Company Ltd.

In order to compare the heat stabilities of the resin compositions thus obtained, test pieces having a thickness of 6.4 mm for the measurement of impact strength were left standing for a long period of time in an atmosphere of 120° C., and the extents of the decrease in quality were compared. The results are shown in Table 6.

TABLE 6

| Experiment No. | Polyphenylene oxide used | Intrinsic viscosity (dl/g) | Izod impact strength (notched) (kg.cm/cm) after treatment at 120° C. for: | | |
|---|---|---|---|---|---|
| | | | 0 hr | 100 hrs | 300 hrs |
| 1 | Product of Example 47 | 0.52 | 16 | 15 | 14.5 |
| 2 | Product of known process (Japan. Pat. Pub. 35,080/77) | 0.58 | 15 | 8 | 7 |

What is claimed is:

1. A process for producing polyphenylene oxide which comprises contacting a phenolic monomer with oxygen in the presence of a catalyst composed of a manganese (II) salt and an ortho-hydroxyazo compound represented by the following general formula:

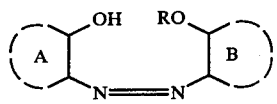

wherein A and B represent identical or different arylene ring having a valency of at least 2 and having an oxy group and an azo group directly linked to the ortho carbon atoms of the arylene ring; and R represents hydrogen atom or lower alkyl group, in a polymerization solvent containing a base and thereby oxidatively polymerizing said phenolic monomer.

2. A process according to claim 1, wherein the oxidative polymerization of phenolic monomer is carried out in the presence of an amine.

3. A process according to claim 1 or 2, wherein the arylene group of ortho-hydroxyazo compound is one selected from the group consisting of monocyclic and polycyclic organic groups having about 6 to about 30 carbon atoms.

4. A process according to claim 1 or 2, wherein said ortho-hydroxyazo compound is a compound represented by the following general formula:

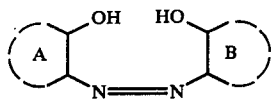

wherein A and B represent identical or different arylene group having a valency of at least 2 and having an oxy group and an azo group directly linked to the ortho carbon atoms of the arylene ring, and A or B has at least one sulfonic acid group or its salt as a substituent.

5. A process according to claim 1 or 2, wherein said ortho-hydroxyazo compound is represented by one of the following formulas:

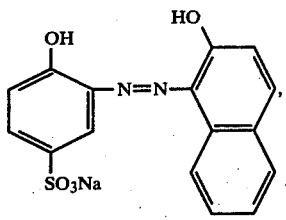

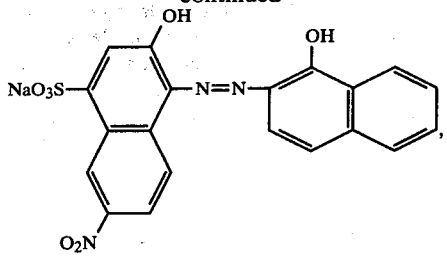

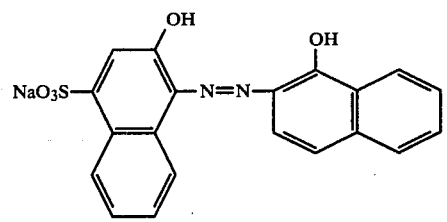

6. A process according to claim 1 or 2, wherein said manganese (II) salt is manganese (II) chloride, manganese (II) bromide, manganese (II) iodide, manganese (II) carbonate, manganese (II) oxalate, manganese (II) sulfate or manganese (II) nitrate.

7. A process according to claim 2, wherein said amine is a secondary amine.

8. A process according to claim 7, wherein said secondary amine is di-n-butyl amine.

9. A process according to claim 2, wherein said amine is a cyclic amine.

10. A process according to claim 9, wherein said cyclic amine is piperidine, 1,3-dipiperidyl propane or morphorine.

11. A process according to claim 2, wherein said amine is an alkylamine having branched structure.

12. A process according to claim 11, wherein said alkylamine having branched structure is iso-butylamine, 2-ethylhexylamine or isopropylamine.

13. A process according to any one of the claims 1 to 12, wherein said polymerization solvent is a lower alkanol having 1-6 carbon atoms and an aromatic organic solvent.

14. A process according to any one of the claims 1 to 12, wherein said alkali metal base is sodium hydroxide, potassium hydroxide, lithium hydroxide or sodium methoxide.

15. A process according to any one of the claims 1 to 12, wherein the molar ratio of manganese (II) salt to phenolic monomer is 1/50 or less.

16. A process according to any one of the claims 1 to 12, wherein the molar ratio of amine to phenolic monomer is 0.05:100 to 10:100.

17. A process according to any one of the claims 1-12, wherein the molar ratio of ortho-hydroxyazo compound to phenolic monomer is 1/50 to 1/2500.

18. A process according to any one of the claims 1 to 12, wherein the ratio of polymerization solvent to phenolic monomer is 40:60 to 5:95 by weight.

19. A process according to any one of the claims 1 to 12, wherein the molar ratio of alkali metal base to phenolic monomer is 1:1 to 100:1.

20. A process according to any one of the claims 1 to 19, wherein said oxidative polymerization is carried out at a temperature of 0°-60° C. under a pressure of 1-100 kg/cm².

21. A process according to any one of the claims 1 to 20, wherein said phenolic monomer is 2,6-xylenol.

* * * * *